Jan. 18, 1955     D. BEZBORODKO     2,699,707
MIRROR
Filed Jan. 17, 1951
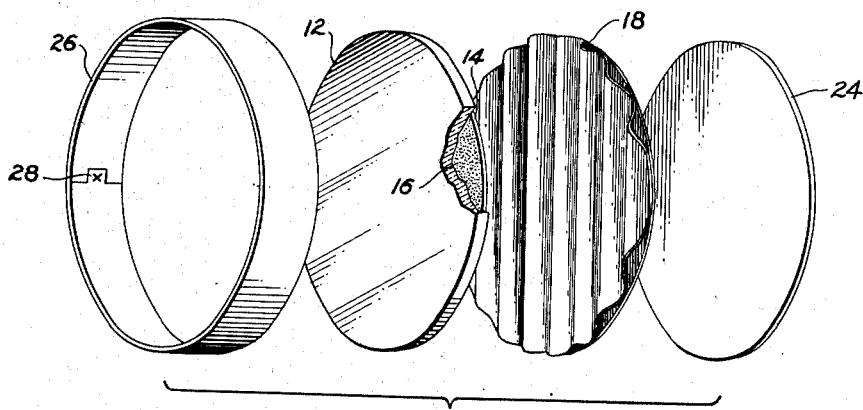
Fig. ~1~
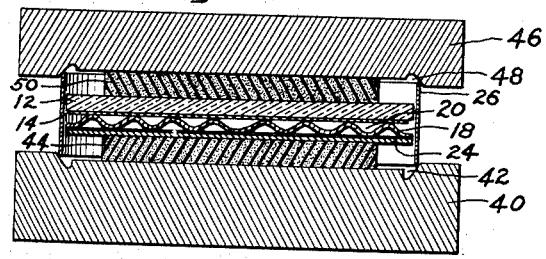
Fig. ~2~
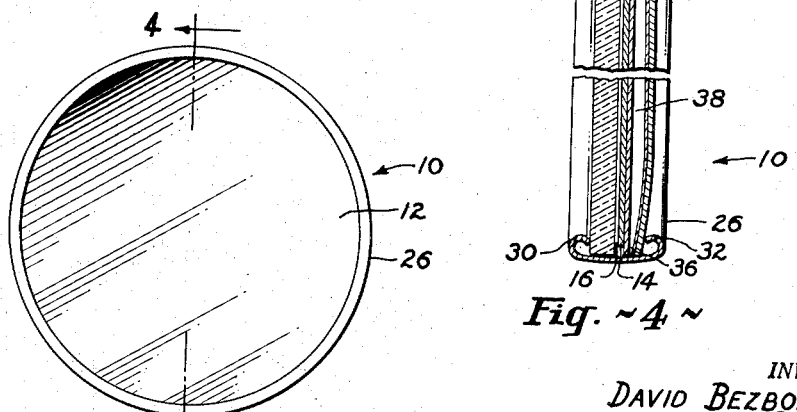
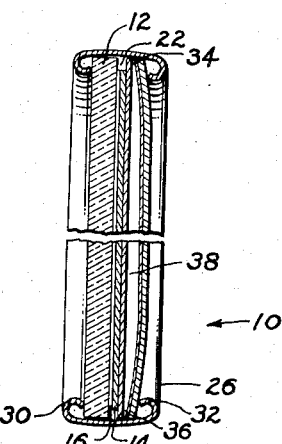
Fig. ~3~     Fig. ~4~
INVENTOR.
DAVID BEZBORODKO
BY
ATTORNEY

United States Patent Office 2,699,707
Patented Jan. 18, 1955

2,699,707
MIRROR

David Bezborodko, New York, N. Y.

Application January 17, 1951, Serial No. 206,429

1 Claim. (Cl. 88—96)

The present invention relates to mirrors, and particularly to mirrors provided with peripheral frames, such as, for example, mirrors employed to provide rearward vision to operators of motor vehicles, portable mirrors used for shaving, folding mirrors, and the like.

It is desirable that mirrors used for the above purposes resist fracture and do not shatter or scatter when broken. These properties have heretofore been achieved to some degree in "safety mirrors" which are formed of two layers of glass, each tempered to obtain the maximum resistance to fracture, and bonded together by a transparent plastic sheet to prevent shatter or scatter of the pieces when the mirror glass is fractured. However, the multi-layered glass is relatively expensive, and its use appreciably increases the weight of the mirror as well as the cost thereof.

Therefore, the primary object of the present invention is to provide a framed mirror for the described uses, formed of a single thickness of mirrored glass, which has high resistance to fracture, as well as being substantially scatter-proof.

Another object resides in the provision of a mirror of the described character which is relatively light in weight and inexpensive.

Another object is to provide a mirror of the described character constructed so that the reflecting material applied to the back surface of the mirror glass is protected from deteriorating attack by moisture or acidic elements that may be present in the atmosphere.

A further object of the present invention is to provide an improved method of fabricating mirrors of the described character having high resistance to fracture and which are substantially scatter-proof.

According to the present invention, the foregoing objects are accomplished by adhesively securing a flexible sheet of material to the silvered back surface of the glass to hold the pieces together when the mirror glass is fractured. The resistance to fracture of the mirror glass is enhanced by providing a backing structure for the latter which includes a member of sealed or closed cellular construction positioned against the back of the mirror glass to cushion or absorb the shock of impact on the latter, and a backing sheet suitably coated to seal the back of the mirror glass against the entry of moisture. The cushioning member, according to the improved method of fabrication, is formed of corrugated cardboard having the ends of the channels or corrugations thereof pinched-off or sealed during the assembly of the several elements. The mirror glass, cushioning member and backing sheet are held together in assembled position by a frame formed of a ring, the opposite edges of which are rolled inwardly and towards each other, preferably in a press, to grip the glass, cushioning member and backing sheet therebetween. The finished axial distance between the opposite rolled edges is such that the corrugated cushioning member is compressed at its peripheral portions to seal off the ends of the channels or corrugations of the latter.

These, and further objects, features and advantages of the invention will be manifest from the following detailed description of an illustrative embodiment thereof when read in conjunction with the accompanying drawings wherein:

Fig. 1 is an exploded perspective view, partly broken away and in section, of the various elements making up a mirror according to an embodiment of the present invention, with the elements being shown prior to the assembly thereof;

Fig. 2 is a vertical, sectional view of the various elements of Fig. 1 shown positioned for assembly;

Fig. 3 is a front elevational view of an assembled mirror embodying the present invention; and Fig. 4 is a vertical, fragmentary, sectional view, on an enlarged scale, taken along the line 4—4 of Fig. 3.

Referring to the drawing in detail, and initially to Fig. 1 thereof, the various parts of a mirror embodying this invention are there shown to include a mirror glass 12, which is circular in the illustrated embodiment but may be formed with any desired configuration, and has the back surface silvered or otherwise provided with a reflecting coating in the usual manner. The mirror glass 12 is preferably formed of mechanically drawn or rolled window glass and the supporting structure for the mirror glass 12, hereinafter described, is constructed to cooperate with the relatively high flexibility or elasticity of such glass in providing improved resistance to fracture.

Scattering or shattering of the mirror glass 12, in the event that the glass is fractured, is prevented by a sheet 14 of flexible material, such as, for example, kraft paper or cloth, which is secured to the back surface of the glass 12 by a layer 16 of flexible, neutral, or acid free, adhesive. It is necessary that the adhesive used in affixing the sheet 14 to the mirror glass 12 be acid free in order to avoid chemical attack or corrosion of the silvering substance by the adjacent adhesive, and a mixture of bone or animal glue, suitably refined to be substantially acid free, and of glycerine, added to provide the required flexibilty, has been found to be satisfactory for this purpose. As seen in Figs. 1 and 4, the sheet 14 is formed so that the periphery thereof is spaced inwardly a small distance, preferably from one-sixteenth to one-quarter of an inch, from the edge of the mirror glass so that the layer of adhesive or glue 16 may dry-out, even after the parts of the mirror are assembled, in the manner to be described. In the event that the mirror glass 12 is fractured, the pieces thereof continue to adhere to the flexible sheet 14 so that scattering or shattering of the broken pieces will not occur. This feature is particularly desirable since it permits use of the mirror with safety in automobiles or other vehicles without fear of injury to the occupants by flying or scattering glass if an accident occurs.

In order to increase the resistance to fracture of the mirror glass 12, the peripheral frame and backing structure are constructed to provide cushioning support over substantially the entire area of the glass so that the shock of impacts against the latter may be absorbed over a relatively large area while making full use of the resilience or flexibility of the glass. The backing structure, according to the present invention, includes a cushioning member 18 of cellular construction, that is, having mutually sealed air containing cells therein, which is positioned against the back of the lamination formed by the mirror glass 12 and the flexible sheet 14 and is substantially coextensive with the mirror glass. Such a cushioning member of cellular construction is conveniently provided by a sheet of corrugated cardboard having the opposite ends of the channels or passages thereof pinched-shut or sealed to form the desired closed air containing cells. As seen in Figs. 1 and 2, the sheet of corrugated cardboard is formed of two layers of cardboard, one layer being corrugated or formed with undulations and the other layer being flat, with the layers being glued together along the lines of contact. The cushioning member 18 is preferably arranged so that the layer of the corrugated cardboard formed with the undulations faces toward the sheet 14 secured to the mirror glass. Thus, when the mirror is assembled parallel channels or spaces 20 (Fig. 2) will be defined between the undulating layer of the cushioning member and the back surface of the anti-scatter sheet 14, which channels will communicate at the opposite ends thereof with the annular space 22 (Fig. 4) defined between the edges of the sheet 14 and glass 12 in back of the latter.

The backing structure is completed by a backing sheet 24 which may be formed of metal, cardboard or any other similar sheet material, but which in the illustrated embodiment is formed of kraft cardboard having one surface coated with a water impervious plastic, such as, for example, one of the acetates. When the mirror is assembled, backing sheet 24 is positioned against the flat layer of the cushioning member with the coated surface of the backing sheet facing outwardly. If desired additional strength and rigidity may be obtained by forming the backing sheet and frame ring integrally.

The various parts of the mirror described above, that is, the mirror glass and anti-scatter sheet, the cushioning member and the backing sheet are held together by a peripheral frame which also functions to pinch-shut the ends of the cell forming passages or channels of the corrugated cardboard making up the cushioning member. The frame consists of a metallic ring 26 which may be formed of a strip of suitable length bent or curved longitudinally to the desired shape so as to fit around the sandwiched mirror glass and anti-scatter sheet, cushioning member and backing sheet and having its opposite ends secured together, as by spot welding 28 uniting a tab formed on one end to the other end portion of the strip. The ring from which the frame is formed has a width substantially greater than the combined thicknesses of the mirror glass and anti-scatter sheet, the cushioning member and the backing sheet (Fig. 2). In assembling the completed mirror 10 (Figs. 3 and 4) from the various components, the opposite edges of the frame ring 26 are rolled inwardly and towards each other to form the rolled beads 30 and 32 (Fig. 4) which grip the sandwiched mirror glass 12, anti-scatter sheet 14, cushioning member 18 and backing sheet 24 therebetween and thus retain these sandwiched elements of the mirror within the frame. As shown in Fig. 4, the final distance between the rolled beads 30 and 32 is less than the uncompressed or free combined thicknesses of the mirror glass and anti-scatter sheet, the cushioning member and the backing sheet, so that the beads at the opposite edges of the ring frame compress, or squeeze together, the two layers of cardboard constituting the corrugated cushioning member 18 to thereby pinch shut the opposite ends 34 and 36 of the channels or passages 38 defined between the undulating and flat layers of the cushioning member.

In accordance with the present invention, the completed mirror 10 is preferably assembled in a single operation illustrated in Fig. 2. In performing this operation, the mirror glass and anti-scatter sheet, the cushioning member and the backing sheet are superposed one on the other in the desired order within the frame ring 26 and this loose assembly is placed upon a stationary die 40 mounted in a press, for example, a punch press. The stationary or fixed die 40 is formed with a groove 42 in its upper surface to receive and shape the adjacent edge of the frame ring. A positioning member 44, of sponge rubber or any other similar soft and resilient material, is carried by the fixed die to position the sandwiched mirror glass and anti-scatter sheet, the cushioning member and the backing sheet centrally relative to the width of the frame ring. An upper or movable die 46 is also mounted in the press and is formed with a groove 48 to receive and shape the adjacent edge of the frame ring during the downward stroke of the die 46. A positioning member 50 is mounted on the movable die and is similar to the member 44. The grooves 42 and 48 of the stationary and movable dies, respectively, are formed with inclined outer walls, vertical inner walls and rounded bottoms to roll the edges of the frame ring inwardly during the downward stroke of the movable die, while the positioning members 44 and 50 hold the sandwiched elements therebetween in centered position. The downward stroke of the movable die is controlled so that the beads formed on the opposite edges of the frame ring during the stroke are sufficiently close together to effect the desired compression of the peripheral portions of the cushioning member 18. Since the dies 40 and 46 in forming the rolled beads exert inwardly directed forces on the opposite edges of the frame ring, the circumferential portion of the frame ring between the rolled edges is outwardly bowed (Fig. 4) during the bead forming operation. This bowed configuration of the formed ring has several advantages in providing a mirror construction endowed with high resistance to fracture. The bowed portion provides a substantially resilient connection between the beads 30 and 32 so that the gripping force of the latter is yieldable to some extent. Further, the bowed portion of the frame ring extends radially outward from the peripheral edge of the sandwiched elements, and, being resilient, cushions or protects the mirror glass from shocks or blows against the side of the frame.

The air filled, sealed channels or cells 38 of the cushioning member 18 provide a soft or resilient support or backing for the mirror glass so that the mirror glass may deflect under shock or impact with the load being absorbed across substantially the entire area of the glass. It should also be noted that the bead 30 extending beyond the face of the mirror glass 12 serves as a protective rim to prevent breakage when the mirror is dropped with the face down and so that the glass is not marred or scratched by placing the mirror face down on a rough surface.

With respect to the protection afforded the silvering or reflecting coating of the mirror glass by the backing and frame construction embodying this invention, it will be noted that bead 32 provides a substantially hermetical seal against the plastic coated outer surface of the backing sheet so that acid containing moisture is excluded from entrance at the back of the mirror. Since the front face of the glass 12 may have surface irregularities it is possible that spaces will appear between the bead 30 and the front face of the mirror glass. If it is desired to completely seal the interior of the mirror because of excessive humidity in the atmosphere of the region in which the mirror is to be used, a band of sealing lacquer may be sprayed, or otherwise applied, to the peripheral portion of the front face of the mirror glass either before or after the mirror is assembled. Since the moisture in the glue or adhesive used to affix the anti-scatter sheet 14 to the rear of the mirror glass may spoil the reflecting coating applied to the latter, the backing structure provides for the dissipation of such moisture even after the mirror is assembled. Thus, the communicating annular space 22 and channels 20 provide a substantial volume of air contacting the margins of the adhesive layer or film to absorb any moisture that may remain in the glue at the time of assembly. When the mirror is assembled in an atmosphere of high humidity, so that the glue layer or film 16 will not be substantially moisture free after the normal drying time, the additional precaution of heating the glass and anti-scatter sheet lamination at the time of assembly within the frame has been found desirable for removing the excess moisture from the glue and thus preventing subsequent deterioration of the reflecting coating.

When the spaces remaining between the bead 30 and the front face of the mirror glass are not sealed by sealing lacquer in the manner heretofore indicated, the sealed air cells of the cushioning member act as atmospheric pressure responsive, expansible and contractible diaphragms for varying the volume of the spaces within the mirror in front of the cushioning member so that the air in these last mentioned spaces is periodically expelled at the front of the mirror and humid air cannot remain in stagnant contact with the reflecting coating for a time sufficient to deteriorate the coating.

From the above description it is apparent that the present invention provides a mirror which is substantially shatter or scatter-proof, which has a high resistance to fracture, and which affords protection against deterioration of the reflecting coating. It is further apparent that the invention provides a method for constructing a mirror having the above characteristics in a simple and inexpensive manner.

While I have described an illustrative embodiment of my invention in detail, it is to be understood that the invention is not limited to that precise embodiment, and that changes and modifications may be effected therein by one skilled in the art without departing from the scope or spirit of the invention as defined by the appended claims.

What I claim is:

A mirror of the described character comprising a mirror glass, a flexible sheet adhesively secured to the back face of said mirror glass and terminating short of the edge of the latter to prevent scatter of the pieces in the event that the glass is fractured, a cushioning member coextensive with said mirror glass and formed of a corrugated layer and a flat layer secured together at their lines of contact to define internal passages therebetween, said cushioning member being arranged with the corrugated layer thereof facing against said flexible sheet to define channels therebetween opening outwardly at the edge of said flexible sheet, a flexible backing sheet positioned against the back surface of said cushioning member and having a moisture impervious coating on its rear surface, said mirror having a band of lacquer on the edge portion of the front face thereof, and a frame ring extending peripherally around said glass and flexible sheet, said cushioning member and said backing sheet, the opposite edges of said frame ring being rolled inwardly and toward each other to grip said glass and flexible sheet, said cushioning member and said backing sheet therebetween, the distance between the rolled edges of the frame ring being no greater than the combined flattened thicknesses of said glass, said flexible sheet, said layers of the cushioning member and said backing sheet so that said rolled edges effect hermetic seals against said coating on the backing sheet and said band of lacquer on the glass and compress the edge portions of said cushioning member to pinch-shut the ends of said internal passages, said frame ring further being outwardly bowed to provide a resilient connection between said rolled edges for cushioning impacts against the side of the mirror glass.

References Cited in the file of this patent

UNITED STATES PATENTS

| Number | Name | Date |
|---|---|---|
| 617,626 | Allen | Jan. 10, 1899 |
| 683,163 | Wideen | Sept. 24, 1901 |
| 822,810 | Zalinski | June 5, 1906 |
| 1,384,420 | Akeley | July 12, 1921 |
| 1,513,734 | Beatty | Nov. 4, 1924 |
| 1,563,018 | Colbert et al. | Nov. 24, 1925 |
| 1,684,560 | Scott | Sept. 18, 1928 |
| 1,812,403 | Hammer | June 30, 1931 |
| 2,121,099 | Putterman | June 21, 1938 |